United States Patent
Suzuki

(10) Patent No.: US 9,568,078 B2
(45) Date of Patent: Feb. 14, 2017

(54) SCREW DEVICE

(71) Applicant: THK CO., LTD., Tokyo (JP)

(72) Inventor: Atsushi Suzuki, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/890,657

(22) PCT Filed: May 20, 2014

(86) PCT No.: PCT/JP2014/063365
§ 371 (c)(1),
(2) Date: Nov. 12, 2015

(87) PCT Pub. No.: WO2014/192595
PCT Pub. Date: Dec. 4, 2014

(65) Prior Publication Data
US 2016/0091066 A1  Mar. 31, 2016

(30) Foreign Application Priority Data

May 31, 2013 (JP) ................... 2013-114802

(51) Int. Cl.
*F16H 1/24* (2006.01)
*F16H 25/22* (2006.01)
*F16H 25/24* (2006.01)

(52) U.S. Cl.
CPC .......... *F16H 25/2214* (2013.01); *F16H 25/22* (2013.01); *F16H 25/2219* (2013.01); *F16H 25/24* (2013.01)

(58) Field of Classification Search
CPC .............. F16H 25/2204; F16H 25/2214; F16H 25/2233; F16H 2025/2242

(Continued)

(56) References Cited

U.S. PATENT DOCUMENTS

| 6,450,055 | B1 | 9/2002 | Sekiya et al. | |
|---|---|---|---|---|
| 6,978,693 | B2* | 12/2005 | Ohkubo | F16H 25/2214 74/424.75 |
| 2002/0023513 | A1* | 2/2002 | Sekiya | F16H 25/2214 74/424.87 |
| 2002/0073794 | A1* | 6/2002 | Ohkubo | F16H 25/2214 74/424.86 |
| 2004/0053563 | A1* | 3/2004 | Kajita | B23Q 5/406 451/52 |
| 2005/0252321 | A1* | 11/2005 | Hartig | B62D 5/0448 74/89.23 |
| 2010/0139433 | A1* | 6/2010 | Chen | F16H 25/2214 74/424.87 |

(Continued)

FOREIGN PATENT DOCUMENTS

| JP | 50-6963 A | 1/1975 |
|---|---|---|
| JP | 2001-141019 A | 5/2001 |

(Continued)

OTHER PUBLICATIONS

International Search Report dated Aug. 5, 2014, issued in counterpart International Application No. PCT/JP2014/063365 (2 pages).

*Primary Examiner* — William Kelleher
*Assistant Examiner* — Zakaria Elahmadi
(74) *Attorney, Agent, or Firm* — Westerman, Hattori, Daniels & Adrian, LLP

(57) ABSTRACT

Provided is a screw device in which a sudden change in force on or a sudden change in the positions of the rolling members can be suppressed at the boundary between a helical loaded rolling-member rolling path and a return path of the screw device.

A curvature radius change section is provided in the return path of the screw device. When viewed in the axial direction of a nut, the curvature radius change section is configured so that the curvature radius of a track centerline of the rolling members in the return path is equal to or larger than the curvature radius of a track centerline of the rolling members in the loaded rolling-member rolling path, and so that the curvature radius of the track centerline of the rolling members in the return path increases gradually or in a stepped manner with increasing distance from the loaded rolling-member rolling path.

12 Claims, 8 Drawing Sheets

(58) Field of Classification Search
USPC .............. 74/424.81, 424.82, 424.83, 424.87,
74/89.44, 89.23
See application file for complete search history.

(56) References Cited

U.S. PATENT DOCUMENTS

| | | | |
|---|---|---|---|
| 2011/0303036 A1* | 12/2011 | Chen ................... | F16H 25/2214 74/424.83 |
| 2013/0068058 A1* | 3/2013 | Allegri ................ | F16H 25/2219 74/424.87 |
| 2013/0298710 A1* | 11/2013 | Kreutzer ............. | F16H 25/2214 74/424.86 |

FOREIGN PATENT DOCUMENTS

| | | |
|---|---|---|
| JP | 2010-25129 A | 2/2010 |
| JP | 2010-25301 A | 2/2010 |
| JP | 2012-112432 A | 6/2012 |

* cited by examiner

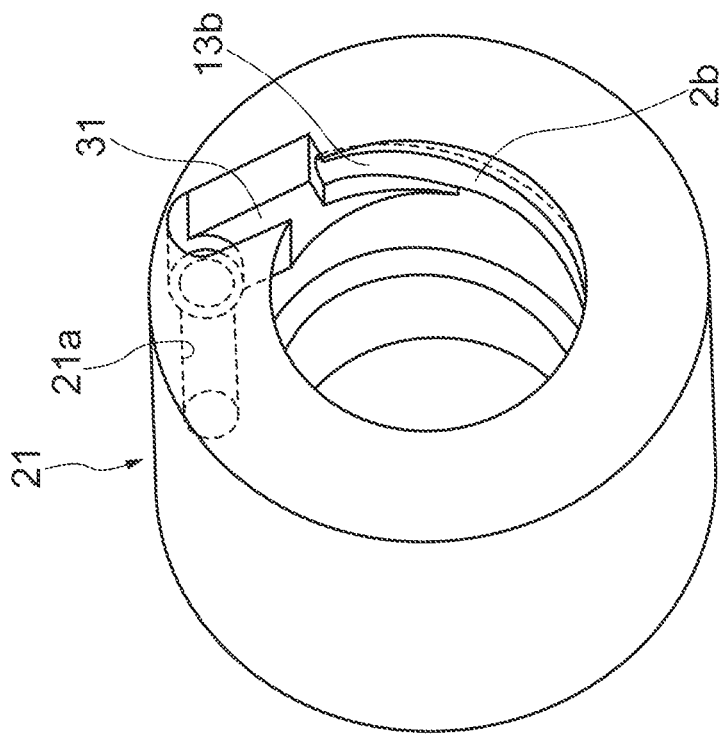
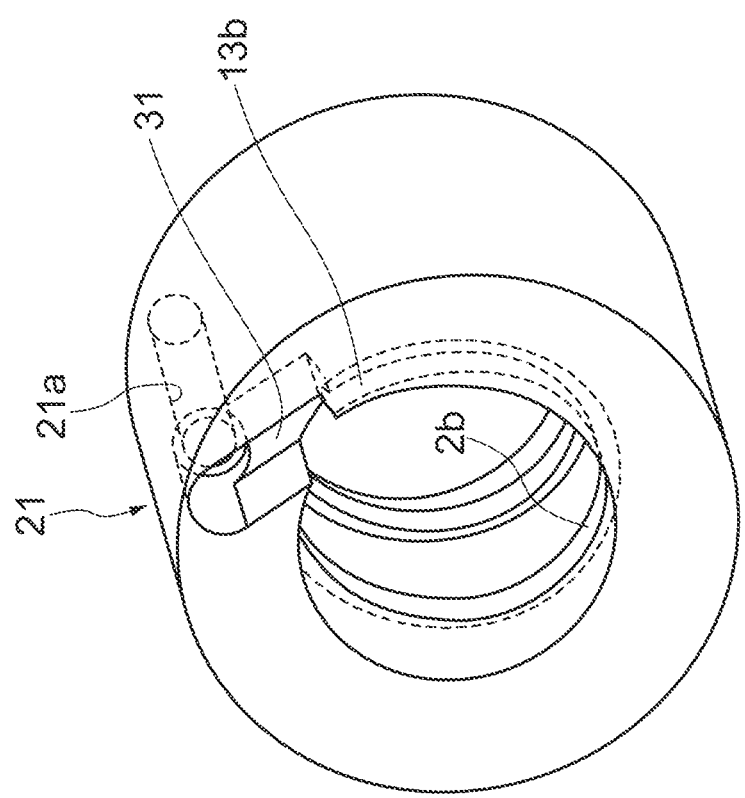

SCREW DEVICE

TECHNICAL FIELD

The present invention relates to a screw device provided with a screw shaft, a nut and rolling members movably interposed between the screw shaft and the nut such that the rolling members circulate.

BACKGROUND ART

Screw devices such as a ball screw and a roller screw are provided with a screw shaft, a nut, rolling members such as balls or rollers which are arranged between the screw shaft and the nut, and a circulation component to endlessly circulate the rolling members. The screw device ensures a smooth motion owing to rolling motions of the rolling members, and has been used as a mechanical element which converts a rotational motion to a linear motion or converts a linear motion to a rotational motion.

The screw shaft has an outer circumferential surface on which a helical rolling-member rolling groove is formed. Meanwhile, the nut has an inner circumferential surface on which a helical loaded rolling-member rolling groove is formed so as to face the rolling-member rolling groove of the screw shaft. In a helical loaded rolling-member rolling path provided between the rolling-member rolling groove of the screw shaft and the loaded rolling-member rolling groove of the nut, many rolling members are arranged movably. A circulation component for circulating the rolling members is attached to the nut. The circulation component has a return path which connects one end and the other end of the helical loaded rolling-member rolling groove. Rotating the screw shaft relatively to the nut enables the rolling members to roll and move along the loaded rolling-member rolling path. The rolling members which have rolled to arrive at one end of the loaded rolling-member rolling groove of the nut return to the other end of the loaded rolling-member rolling groove via the return path of the circulation component.

It is usual that, at the boundary between the helical loaded rolling-member rolling path and the return path, the linear return path is arranged to be oriented in a tangential direction of the helical loaded rolling-member rolling path. In other words, it is usually designed such that, when viewed in the axial direction of the nut, the linear return path is directed in the circular loaded rolling-member rolling path. The rolling members move along the helical loaded rolling-member rolling path while being loaded during the movement, and leave the loaded rolling-member rolling path to enter the linear return path, and move along the linear return path.

CITATION LIST

Patent Literature

Patent Literature 1: Japanese Patent Application Laid-open No. 2012-112432

SUMMARY OF THE INVENTION

Technical Problem

Since the rolling members move along the helical track in the loaded rolling-member rolling path, centrifugal force acts on the rolling members. In contrast, when the rolling members move along the linear track in the return path, there is no centrifugal force acting on the rolling members. As a result, when the rolling members transit from the loaded rolling-member rolling path to the return path or from the return path to the loaded rolling-member rolling path, a sudden change in the centrifugal force acts on the rolling members.

In the loaded rolling-member rolling path, the rolling members are subjected to a load, so that the rolling members are restricted to a certain position in the path but allowed to move along the helical track in the path. In contrast, when entering the return path, the rolling members are allowed to move along the return path provided with an inner diameter larger than the diameter of the rolling members. That is, the rolling members are allowed to move freely, because there is a play between the rolling member and the inner wall of the return path. For this reason, there will occur displacements in the central positions of the rolling members between the rolling member which has contact on the inner wall of the return path and the rolling member which has entered the loaded rolling-member rolling path. Hence, a sudden positional change of the rolling members occurs at the boundary between the return path and the loaded rolling-member rolling path or the track of the rolling members in the return path is zigzagged when a jam of the rolling members occurs.

As described above, the conventional screw device has a problem that the rolling members are subjected to a sudden change in force acting on the rolling members or a sudden change in the positions of the rolling members at the boundary between the loaded rolling-member rolling path and the return path. It is thus an object of the present invention to provide a screw device in which a sudden change in force acting on rolling members or a sudden change in the positions of rolling members can be suppressed at the boundary between the loaded rolling-member rolling path and the return path, ensuring the smooth movement of the rolling members.

Solution to Problem

In order to accomplish the foregoing object, the present invention provides a screw device comprising: a screw shaft having a helical rolling-member rolling groove on an outer circumferential surface thereof; a nut having a helical loaded rolling-member rolling groove opposed to the rolling-member rolling groove on an inner circumferential surface thereof; a return path connecting one end and the other end of a helical loaded rolling-member rolling path formed by the rolling-member rolling groove of the screw shaft and the loaded rolling-member rolling groove of the nut; and a plurality of rolling members arranged in the loaded rolling-member rolling path and the return path. The screw device is characterized in that, when viewed in the axial direction of the a nut, a curvature radius change section is provided in the return path, the curvature radius change section is configured so that a curvature radius of a track centerline of the rolling members in the return path is equal to or larger than a curvature radius of a track centerline of the rolling members in the loaded rolling-member rolling path, and so that the curvature radius of the track centerline of the rolling members in the return path increases gradually or in a stepped manner with increasing distance from the loaded rolling-member rolling path.

Advantageous Effects of the Invention

In the present invention, the curvature radius of the track centerline of the return path increases gradually or in a stepped manner with increasing distance from the loaded rolling-member rolling path. The rolling members enter the loaded rolling-member rolling path from the return path with an increasing centrifugal force acting on the rolling members, and enter the return path from the loaded rolling-member rolling path with a decreasing centrifugal force acting on the rolling members. As a result, it is possible to prevent the centrifugal force acting on the rolling members from changing suddenly at the boundary between the return path and the loaded rolling-member rolling path.

Additionally, the track centerline passing through the rolling members in the return path is curved, resulting in causing the centrifugal force acting on the rolling members which move through the return path. With being pressed onto the inner surface of the outer circumferential wall of the return path due to the centrifugal force, the rolling members move through the return path. Hence, the rolling members become easier to be lined up in the return path, thus preventing the rolling members from causing sudden positional changes at the boundary. Moreover, the configuration that the track centerline passing through the rolling members in the return path is curved still provides another advantage. That is, this configuration causes a force in the rolling members which presses the rolling members towards the outer circumferential side of the return path even if the rolling members are jammed. By this pressing force, it is also easier to make the rolling members line up in the return path.

BRIEF DESCRIPTION OF THE DRAWINGS

FIGS. 4 (*a*) and 4 (*b*) are perspective views showing a nut body according to the embodiment (FIG. 4 (*a*) shows a perspective view of the nut body obtained when being viewed in the same direction as in FIG. 2 and FIG. 4 (*b*) shows a perspective view of the nut body obtained when being viewed in the opposite direction to that in FIG. 2);

DESCRIPTION OF EMBODIMENTS

Figure 1:
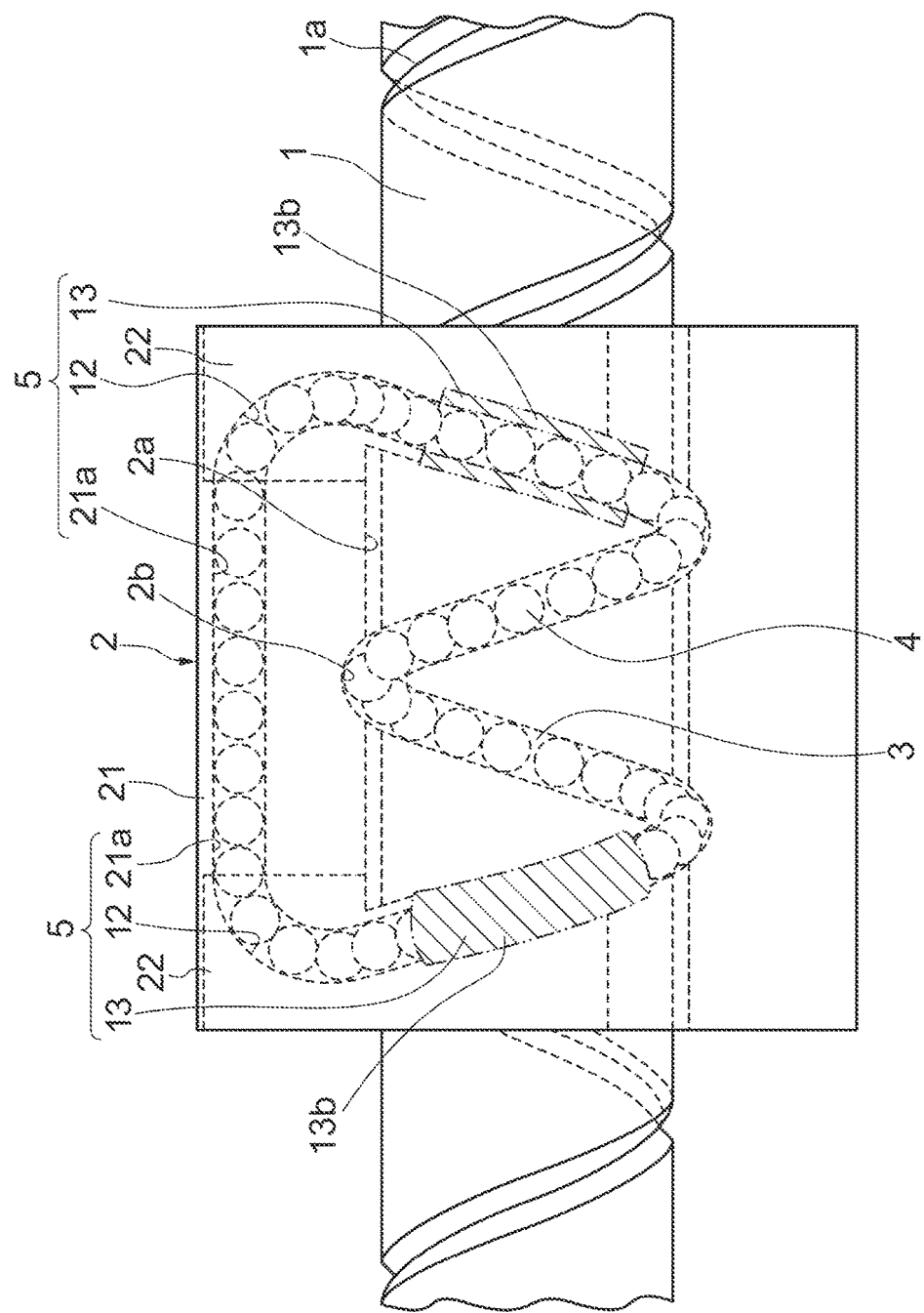
FIG. 1 is a side view showing a screw device according to an embodiment of the present invention.
Figure 2:
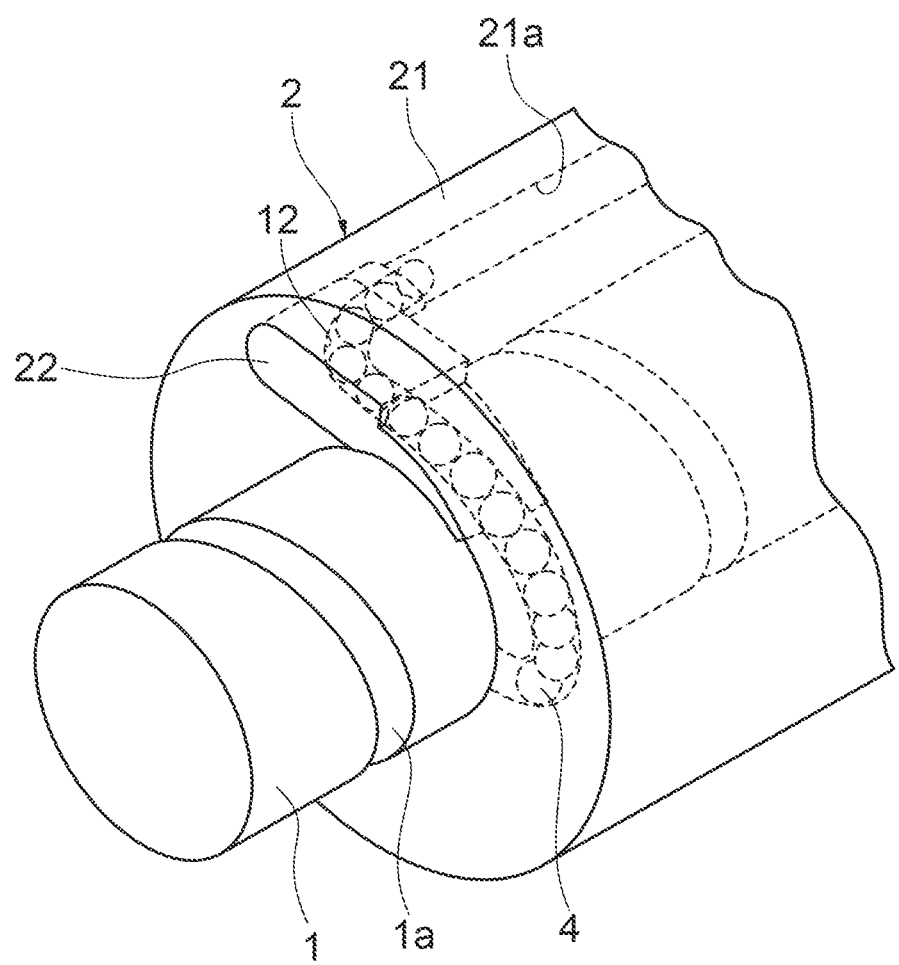
FIG. 2 is a perspective view showing the screw device according to the embodiment.
Figure 3:
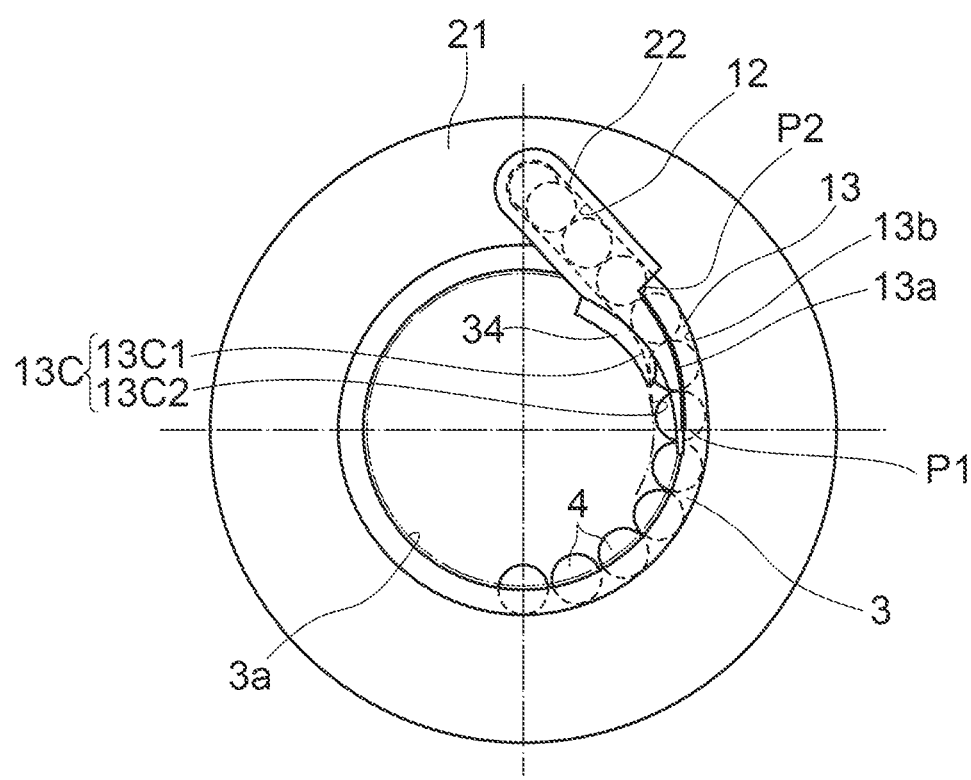
FIG. 3 is a frontal view showing the screw device according to the embodiment (when viewed in the axial direction of a nut)

Referring to the accompanying drawings, a screw device according to an embodiment of the present invention will now be described. FIGS. 1 to 3 show the screw device according to the embodiment. FIG. 1 shows a side view of the screw device, FIG. 2 is a perspective view of the screw device, and FIG. 3 is a frontal view showing the screw device when being viewed in the axial direction thereof. The screw device is provided with a screw shaft 1, a nut 2 with an opening 2*a* through which the screw shaft 1 passes, and balls 4 serving as a plurality of rolling members, which are provided so as to roll and move interposed between the screw shaft 1 and the nut 2.

The screw shaft 1 has an outer circumferential surface, on which a ball rolling groove 1*a* is formed as a helical rolling-member rolling groove. The ball rolling groove 1*a* has a certain lead. In the present embodiment, the rolling groove 1*a* is exemplified as a single thread, but the number of threads for the ball rolling grooves 1*a* may be set to be plural, such as double threads, triple threads, or more threads. The ball rolling groove 1*a* is formed to have a cross section showing a gothic arch groove shape in which two arcs are combined. Each of the balls 4 comes into contact at two points of the ball rolling groove 1*a* of the screw shaft 1. In general, the screw shaft 1 is made of steel. The surface of the ball rolling groove 1*a* is subjected to heat treatment and grinding processing with a grinding stone, so that the balls 4 can be rolled smoothly.

The nut 2 has an inner circumferential surface on which a loaded ball rolling groove 2*b* is formed which functions as a helical loaded rolling-member rolling groove. This loaded ball rolling groove 2*b* faces the ball rolling groove 1*a* of the screw shaft 1. The lead and the number of threads of the loaded ball rolling groove 2*b* are equal to the lead and the number of threads of the ball rolling groove 1*a*. The loaded ball rolling groove 2*b* has a cross section which also shows a gothic arch groove shape of a combination of two arcs. Hence, each of the balls 4 comes into contact at two points of the loaded ball rolling groove 2*b* of the nut 2. In general, the nut 2 (except for the circulation components) is made of steel. The surface of the loaded ball rolling groove 2*b* is subjected to heat treatment and grinding processing with a grinding stone, so that the balls 4 can be rolled smoothly.

Between the loaded ball rolling groove 2*b* of the nut 2 and the ball rolling groove 1*a* of the screw shaft 1, a helical loaded ball rolling path 3 is formed which serves as the loaded rolling-member rolling path. A gap between the loaded ball rolling groove 2*b* of the nut 2 and the ball rolling groove 1*a* of the screw shaft 1 is smaller than the diameter of each ball 4, resulting in that the balls 4 in the loaded ball rolling path 3 are subjected to a compressive load between the nut 2 and the screw shaft 1.

A return path 5 is provided in the nut 5, where the return path 5 connects one end and the other end of the helical loaded ball rolling path 3. The plurality of balls 4 are arranged in the loaded ball rolling path 3 and the return path 5. Between two of the balls 4, a spacer (not shown) may be placed. In the loaded ball rolling path 3, the balls 4 roll with a load between the ball rolling groove 1*a* of the screw shaft 1 and the loaded ball rolling grove 2*b* of the nut 2, and the track centerline passing through the balls 4 is a helical form. On the other hand, in the return path 5, the track center line passing through the balls 4 deviates from the helical form.

The return path 5 (except for the portions of the return path 5, which portions are close to the loaded ball rolling path 3, as described later) has an inner diameter larger than the diameter of each ball 4. Hence the balls 4 are free from being loaded in the return path 5, so that the balls 4 can roll, with being pushed by the following other balls. Relative rotation of the nut 2 to the screw shaft 1 makes the loaded balls 4 can roll through the loaded ball rolling path 3. After having rolled and reached one end of the loaded ball rolling groove 2b of the nut 2, each of the balls 4 enters the return path 5, so that the balls 4 are released from being loaded. In this way, the balls 4 roll through the return path 5, and return to the other end of the loaded ball rolling groove 2b.

The nut 2 is provided with a nut body 21 on which the loaded ball rolling groove 2b is formed and circulation components 22 attached to both axial ends of the nut body 21. In the nut body 21, a through hole 21a is formed to extend in its axial direction. In the circulation components 22 attached to the nut body 21, a direction changing path 12 is formed. In the nut body 21, an outer circumferential side 13b composing a part of each of the curvature radius change sections 13 is formed so as to extend from the loaded ball rolling groove 2b. For the sake of clear understanding, these outer circumferential sides 13b of the curvature radius change sections 13 are shown by shaded areas in FIG. 1. Although the outer circumferential side 13b of each of the curvature radius change sections 13 is shown as if it is separated from the nut body 21 in the figure, the outer circumferential side 13b of the curvature radius change section 13 is united with the nut body 21. The direction changing path 12 of each of the circulation components 22 connects the through hole 21a and the curvature radius change sections 13. The through hole 21a of the nut body 21, the direction changing paths 12 of the circulation components 22, and the curvature radius change sections 13 comprise the return path 5.

As shown in FIG. 3, when viewed in the axial direction of the nut 2, the curvature radius change section 13 formed to be continuous from the loaded ball rolling path 3 is provided in the return path 5. The track centerline 3a through the balls 4 in the loaded ball rolling path 3 is shown by a dashed line, while the track centerline 13a through the balls 4 in the curvature radius change section 13 is shown by a thick line. In the curvature radius change section 13, the track centerline 13a through the balls 4 has a curvature radius which is set to be equal to or larger than the curvature radius of the track center line 3a through the balls 4 in the loaded ball rolling path 3. In addition to this curvature structure, with increasing distance from the loaded ball rolling path 3 (that is, as approaching the direction changing path 12), the curvature radius of the track centerline 13a through the balls 4 is set to increase gradually or in a stepped manner. In the curvature radius change section 13, the track centerline 13a through the balls 4 is shifted outward from the track centerline 3a through the balls 4 in the loaded ball rolling path 3. The center of curvature of the track centerline 13a passing through the balls 4 is positioned in the screw shaft 1. The curvature radius change sections 13 and the loaded ball rolling path 3 are connected at a connection point P1, at which the track centerline 13a in the curvature radius change section 13 has a tangential direction which is in agreement with that of the track centerline 3a in the loaded ball rolling path 3. That is, the track centerline 13a in the curvature radius change section 13 is a curve with a lead. Moreover, at the connection point P1, the curvature radius of the track centerline 13a in the curvature radius change section 13 is equal to or larger than the curvature radius of the track centerline 3a in the loaded ball rolling path 3. As shown in FIG. 3, the circulation component 22 has the direction changing path 12, which is formed as being linear when viewed in the axial direction of the nut 2. At a connection point P2 where the direction changing path 12 of the circulation component 22 is connected, the track centerline 13a of the curvature radius change section 13 has a curvature radius of infinite. The curvature radius change section 13 has a length (that is, a length of the track centerline 13a, which ranges from the point P1 to the point P2) is more than twice as large as the diameter of each of the balls. In the present embodiment, the connection point P1 exists on a horizontal line laterally crossing the center in the height direction of the nut 2, but this may be changed. For example, the connection point P1 can be set to be closer or farther to the circulation component 22 according to the trajectory of the track centerline 13a in the curvature radius change section 13.

In each of the curvature radius change sections 13, the balls 4 move along and on the outer circumferential side 13b of the curvature radius change sections 13 formed at the nut 2. Thus the track centerline 13a through the balls 4 in the curvature radius change section 13 agrees with the trajectory of the centers of the balls 4 moving along the outer circumferential side 13b of each curvature radius change sections 13 of the nut 2. On the other hand, in the loaded ball rolling path 3, the balls 4 move while being tightly pinched between the loaded ball rolling groove 2b of the nut 2 and the ball rolling groove 1a of the screw shaft 1. In this state, the track centerline 3a passing through the balls 4 agrees with the center line of the loaded ball rolling path 3, thus being circular. The curvature radius of the track centerline 3a through the balls 4 in the loaded ball rolling path 3 is ½ of a BCD (Ball Circle Diameter).

The track centerline 13a through the balls 4 is depicted as either a transition curve or a combined curve in which a plurality of arcs having mutually different curvature radiuses are combined. The transition curve is used as, for example, curves of express highways, in which the curvature continuously changes proportionally to a curve length. The transition curve will be detailed later. The combined curve is a curve produced by combining two or more arcs, for example, an arc of a radius R1 and an arc of a radius R2 (a relationship of R1<R2 is met).

As described, the outer circumferential side 13b of each of the curvature radius change sections 13 is provided at the nut 2. The curvature radius change section has an inner circumferential side 13c which includes a part 13c2 closer to the loaded ball rolling path 3 and a part 13c1 distant from the loaded ball rolling path 3. The part 13c2 is comprised by the outer circumferential surface of the screw shaft 1, and the part 13c1 is comprised by each circulation component 22. The outer circumferential side 13b of the curvature radius change section 13 is continued from the loaded ball rolling groove 2b of the nut 2. Hence, of the balls 4, balls 4 which have just entered the outer circumferential side 13b of the curvature radius change section 13 from the loaded ball rolling groove 2b are also loaded in the same manner as that applied to balls 4 which are still present in the loaded ball rolling groove 2b. The balls 4 which move along the outer circumferential side 13b of the curvature radius change section 13 are gradually released from being loaded, with increasing distance from the loaded ball rolling groove 2b. The balls become released completely from being loaded, on the way of the curvature radius change section 13 (in the present embodiment, on the way of the part 13c2 close to the loaded ball rolling path 3) and enter the circulation component 22 with no load.

FIG. 4 (*a*) shows a perspective view of the nut body 21 viewed in the same direction shown in FIG. 2, while FIG. 4 (*b*) shows another perspective view of the nut body 21 viewed in the opposite direction to that in FIG. 2. A recess 31 is formed on each of the both end surfaces of the nut body 21 in the axial direction, where the circulation component 22 is attached to the recess 31. Each of the recesses 31 is formed to communicate with the through hole 21*a*. Mounting the circulation component 22 to the recess 31 makes it possible to connect the direction changing path 12 of the circulation component 22 to the through hole 21*a*. The nut body 21 has an inner circumferential surface on a part of which the outer circumferential side 13*b* of each curvature radius change section 13 is formed as an extended groove of the loaded ball rolling groove 2*b*. The outer circumferential side 13*b* of each curvature radius change section 13 has a cross section shaped into a gothic arch groove of combined two arcs. Thus the balls 4 come in contact at two points of the outer circumferential side 13*b* of each curvature radius change section 13 of the nut 2. Each of the recesses 31 is also connected to the outer circumferential side 13*b* of the curvature radius change section 13, so that attaching the circulation component 22 to each recess 31 enables the direction changing path 12 of the circulation component 22 to be connected to the outer circumferential side 13*b* of the curvature radius change section 13.

Figure 5:
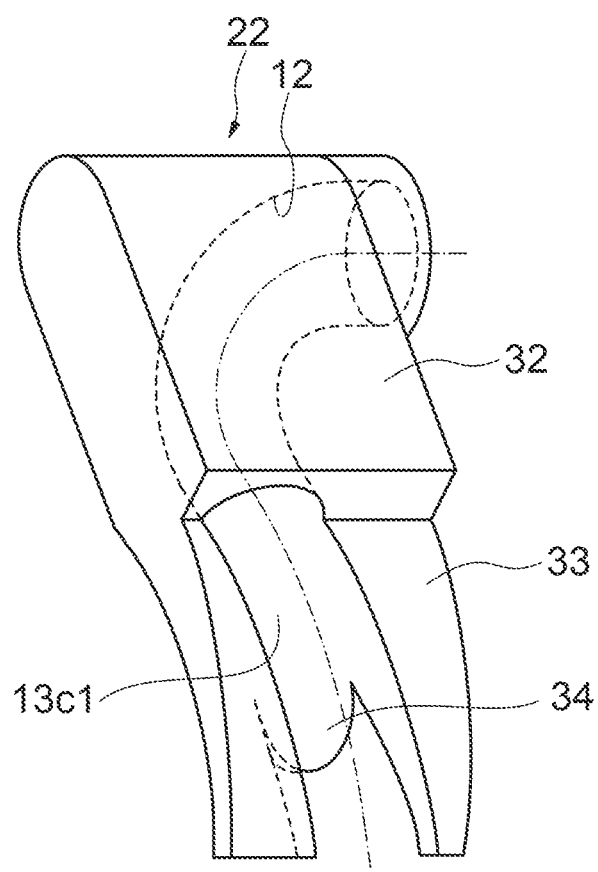
FIG. 5 is a perspective view showing a circulation component according to the embodiment.

FIG. 5 shows a perspective view of the circulation component 22. The circulation component 22 is provided with a body 32 being fit into each of the recesses 31 of the nut body 21 and an extended part 33 being touched with the inner circumferential surface of the nut 2. In the body 32, the direction changing path 12 is formed. The direction changing path 12 has a cross section shaped as a circle having a radius larger than that of each ball 4. The extended part 33 is made into a thin part by removing the lower part of the body 32. At the extended part 33, the inner circumferential side 13*c*1 of each curvature radius change section 13 is formed. This inner circumferential side 13*c*1 of the curvature radius change section 13 has a cross section shaped as a half circle whose radius is larger than that of each ball 4. The extended part 33 cooperate with the outer circumferential side 13*b* of each curvature radius change section 13 of the nut 2 so as to comprise the curvature radius change section 13 whose section is closed. At the tip of the extended part 33, a scoop part 34 for scooping the balls 4 is formed, so that the balls 4 are taken into the circulation component 22 by the scoop part 34. The outer circumferential side 13*b* of each curvature radius change section 13 of the nut 2 extends to a deep part of the circulation component 22 beyond the scoop part 34 (refer to FIG. 3).

Figure 6:
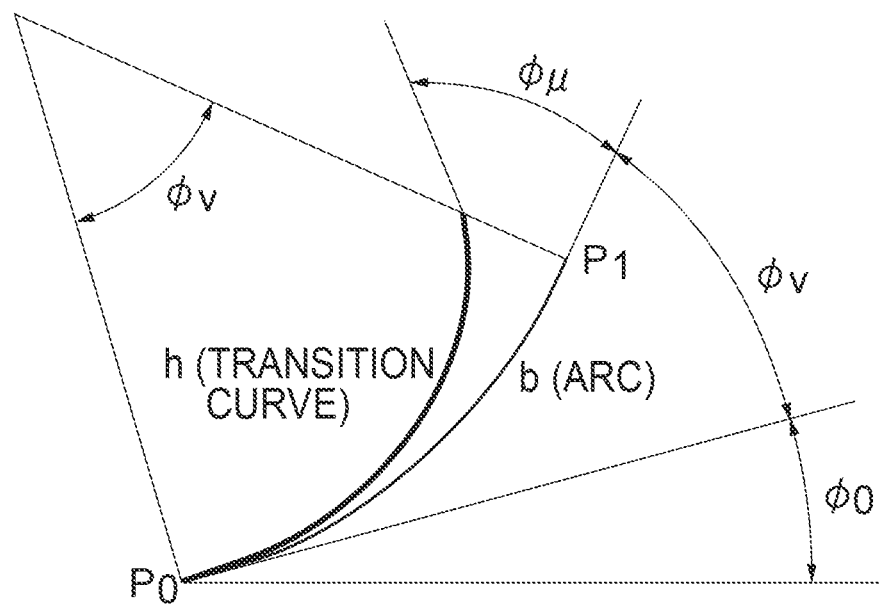
FIG. 6 is a view illustrating a transition curve.

The transition curve can be explained as follows. FIG. 6 is an illustration showing a transition curve (clothoid curve). In FIG. 6, a transition curve ranging from a start point $P_0$ to an end point $P_1$ can be expressed by the following four parameters.

h: a length of the curve from the start point $P_0$ to the end point $P_1$,
$\phi_0$: a tangential angle at the start point $P_0$,
$\phi_v$: an increment of an arc in the tangential angle, and
$\phi_U$: an increment of a clothoid curve in the tangential angle,
where the units of the above three angles are radians in the following formulae.

A point P on this transition curve can be obtained by the formula 1, in which the y-axis is taken as an imaginary axis (j-axis) and a non-dimensional displacement S is employed as a variable.

[formula 1]

$$P = P_0 + h \int_0^s \exp(j\phi) dS \quad (1)$$

$$\phi = \phi_0 + \phi_v S + \phi_u S^2 \quad (2)$$

$$S = \frac{s}{h}, \quad (3)$$
$$0 \le S \le 1$$

In this formula, $\phi$ shows a tangential direction of the curve at the point P and S shows a value obtained by dividing, by h, a length s of a curve starting from the start point $P_0$ to the point P. The curvature $c_v$ of this curve can be obtained by a formula 2.

[formula 2]

$$c_v = \frac{d\phi}{ds} = \frac{1}{h}(\phi_v + 2\phi_u S) \quad (4)$$

A reduction ratio, that is, a change rate $c_u$ of the curvature can be obtained by a formula 3.

[formula 3]

$$c_u = \frac{d^2\phi}{ds^2} = \frac{2\phi_u}{h^2} \quad (5)$$

The formula 3 gives a constant value to the change rate $c_u$ of the curvature. In other words, the transition curve is set as a curve whose curvature changes linearly (according to a linear expression) relative to the length of the curve. By using this way, a smooth curve whose curvature changes continuously can be obtained.

How to produce the outer circumferential side 13*b* of each curvature radius change section 13 is as follows. The loaded ball rolling groove 2*b* of the nut 2 is subjected to grinding work in a state where a smaller-diameter grind stone is pushed to the loaded ball rolling groove 2*b* of the nut 2 with rotation of the grind stone. At this grinding work, the grind stone is moved in the axial direction of the nut 2 with rotation of the nut 2. With this work, the helical loaded ball rolling groove 2*b* is ground. After the loaded ball rolling groove 2*b* of the nut 2 has been ground, the grind stone is further moved along the transition curve in the radial direction of the nut 2, which makes it possible to grind the outer circumferential side 13*b* of the curvature radius change section13. In an actual application, in order to facilitate the grinding work, a relationship between the position of the nut 2 in the circumferential direction and the position of the grind stone in the radial direction of the nut 2 is digitized beforehand, and the grind stone is moved in the radial direction according to the digitalized values.

Figure 7A:
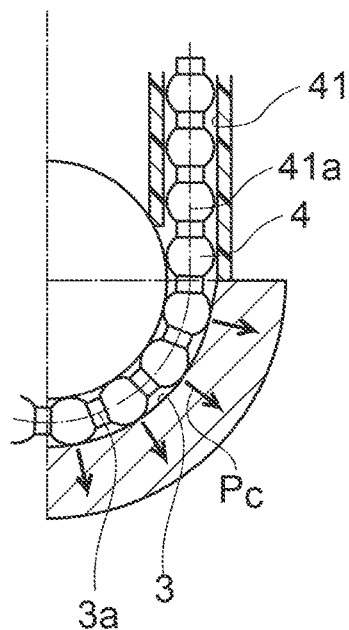
FIGS. 7 (*a*) to 7 (*c*) are views comparing centrifugal force acting on the balls in a state where the balls are scooped up in a tangential direction according to the conventional method and a state where the balls are scooped up with changes in curvature radiuses according to the present embodiment (FIG. 7 (*a*) and FIG. 7 (*b*) show tangential-direction scooping of the balls according to the conventional method and FIG. 7 (*c*) shows scooping with changes in curvature radiuses according to the present embodiment)
Figure 7B:
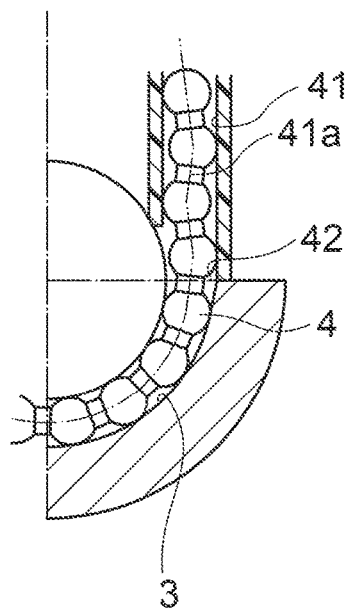
Figure 7C:
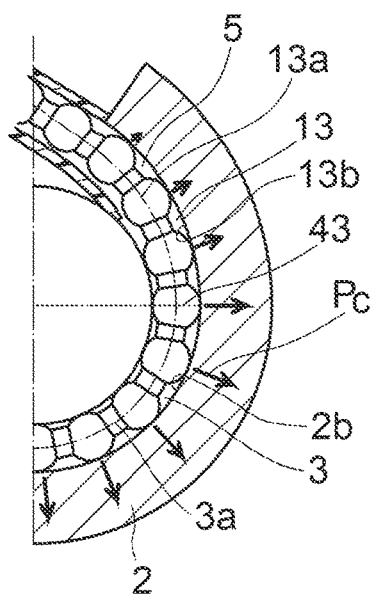
Figure 8A:
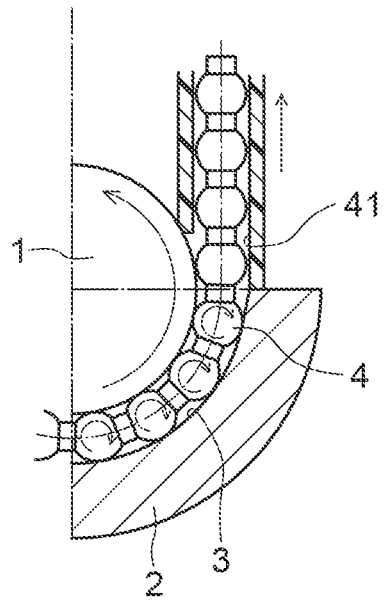
FIGS. 8 (*a*) to 8 (*d*) are views comparing spins of the balls in a state where the balls are scooped up in a tangential direction according to the conventional method and a state where the balls are scooped up with changes in curvature radiuses according to the present embodiment (FIG. 8 (*a*) and FIG. 8 (*b*) show tangential-direction scooping of the balls according to the conventional method, and FIG. 8 (*c*) and FIG. 8 (*d*) show scooping with changes in curvature radiuses according to the present embodiment).
Figure 8B:
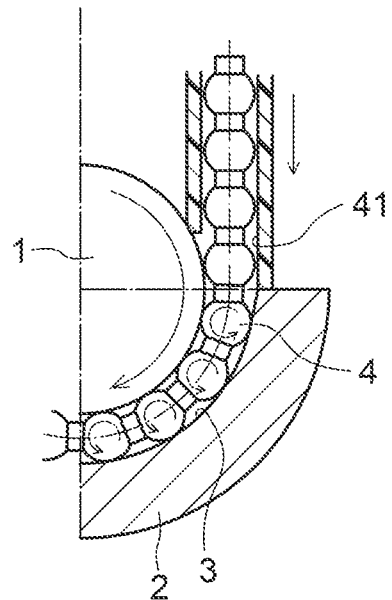
Figure 8C:
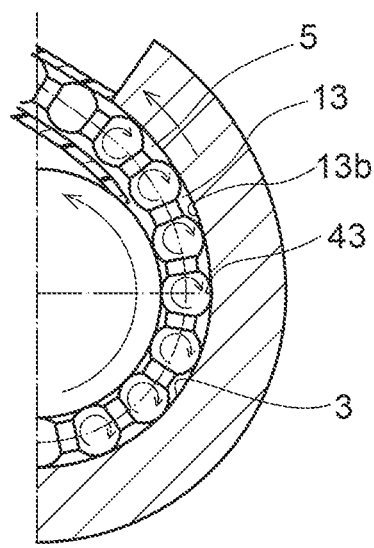
Figure 8D:
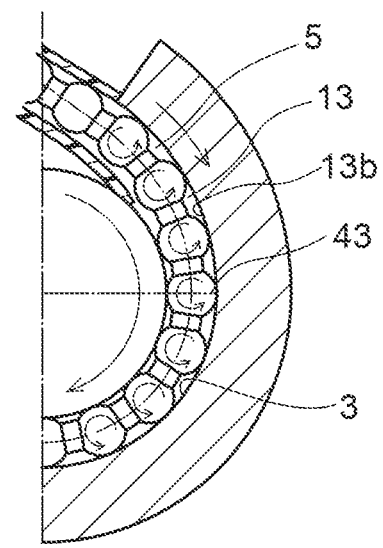

As described, the structure of the screw device according to the present embodiment has been described. Various advantages of the screw device according to the present embodiment will now be described with reference to the drawings. FIGS. 7 (*a*) to 7 (*c*) show comparison of a centrifugal force Pc acting on the balls 4 between a conventional scoop operation in the tangential direction and a scoop operation with changes in the curvature radius which is according to the present embodiment. FIG. 7 (*a*) and FIG.

7 (*b*) show the conventional scoop operation in the tangential direction, while FIG. 7 (*c*) shows a scoop operation with changes in the curvature radius which is according to the present embodiment. As shown in FIG. 7 (*a*), in the conventional scoop operation in the tangential direction, the track centerline 3*a* through the balls 4 is a helical line in the loaded ball rolling path 3 and the track centerline 41*a* of the balls 4 in the return path 41 is a linear line. From the loaded ball rolling path 3 to the return path 41, the balls 4 advance to the tangential direction of the helical track. In this case, a constant centrifugal force Pc acts on the balls 4 which move in the loaded ball rolling path 3. In contrast, there is no centrifugal force acting on the balls 4 which move in the return path 41. Hence, the centrifugal force acting on the balls 4 changes suddenly when the balls 4 transit from the loaded ball rolling path 3 to the return path 41 or from the return path 41 to the loaded ball rolling path 3.

As shown in FIG. 7 (*b*), the balls 4 move along the helical track in the loaded ball rolling path 3, during which the rolling of the balls 4 are restricted to a preset position in the path 3. In contrast, when the balls 4 enter the return path 41, the balls 4 can be moved freely in the return path 41, because the balls 4 are allowed to move in the cylinder whose size is larger than the size of each ball 4. Hence, there occurs a shift in the centers of the balls 4 between a state where the balls 4 are contacting on the wall of the cylindrical return path 41 and a state where the balls 4 are held within the loaded ball rolling path 3, which causes a sudden change in the positions of the balls 4 at the boundary 42. If there is caused a jam of the balls 4, the track centerline 41*a* through the balls 4 in the return path 41 becomes a zigzag, thus deteriorating continuity of the track centerline 41*a*.

On the other hand, in the scoop operation with changes in the curvature radius which is according to the present embodiment, as shown in FIG. 7 (*c*), the curvature radius of the track centerline 13*a* of the curvature radius change section 13 changes gradually. Hence, with an increasing centrifugal force acting on the balls 4, the balls 4 enter the loaded ball rolling path 3 from the return path 5, and with a decreasing centrifugal force acting on the balls 4, the balls 4 move to the return path 5 from the loaded ball rolling path 3. As a result, it is possible to suppress a sudden change in the centrifugal force acting on the balls 4, which occurs at the boundary 43 between the return path 5 and the loaded ball rolling path 3.

In addition, the loaded ball rolling groove 2*b* of the nut 2 is extended so as to comprise the outer circumferential side 13*b* of the curvature radius change section 13 of the return path 5. Hence, at the boundary 43 between the loaded ball rolling path 3 and the return path 5, both the track centerlines 3*a* and 13*a* passing through the balls 4 are kept to be continuous, thereby enabling the balls 4 to smoothly move over boundary 43. Moreover, the track centerline 13*a* through the balls 4 is curved in the return path 5, which strengthens the centrifugal force acting on the balls 4 which move through the return path 5. Hence, the balls 4 move through the return path 5, with the balls 4 pushed to the outer circumferential side 13*b* of the return path 5 by the centrifugal force. It is thus easier that the balls 4 are lined up in the return path 5. Even if the balls 4 are about to be jammed, it is easier for the balls 4 to be lined up in the return path 5 in response to a force which pushes the balls 4 to the outer circumferential side 13*b* of the return path 5.

FIGS. 8 (*a*) to 8 (*d*) compare rotation of the balls 4 between the conventional scoop operation in the tangential direction and the scoop operation with changes in the curvature radius which is according to the present embodiment. FIG. 8 (*a*) and FIG. 8 (*b*) show the conventional scoop operation in the tangential direction, whilst FIG. 8 (*c*) and FIG. 8 (*d*) show the scoop operation with changes in the curvature radius which is according to the present embodiment. As shown in FIG. 8 (*a*), in the conventional scoop operation in the tangential direction, when the screw shaft 1 is rotated counterclockwise, the balls 4 rotate clockwise and move through the helical track in the loaded ball rolling path 3. However, the balls 4 do not rotate in the cylindrical return path 41. Therefore, as shown in FIG. 8 (*b*), the balls 4 are obliged to start their rotational motions suddenly when the balls 4 enter the loaded ball rolling path 3 from the return path 41. This leads to a sudden change from a no-rotational motion to a rotational motion for each ball 4.

In contrast, in the scoop operation with changes in the curvature radius which is according to the present embodiment, as shown in FIG. 8 (*c*), when the balls 4 move to the return path 5 from the loaded ball rolling path 3, the balls 4 move, while rotating clockwise, on the outer circumferential side 13*b* of the curvature radius change section 13. Moreover, as shown in FIG. 8 (*d*), at a transition from the return path 5 to the loaded ball rolling path 3, the balls 4 move, while rotating counterclockwise, on the outer circumferential side 13*b* of the curvature radius change section 13. As a result, the rotational motions of the balls 4 can be prevented from changing suddenly at the boundary 43 between the loaded ball rolling path 3 and the return path 5, whereby the balls 4 can move over the boundary 43 smoothly. When the screw device is rotated at faster speeds, the centrifugal force acting on the balls 4, the force lining up the balls 4, and the force rotating the balls 4 are strengthened more, thereby making the balls 4 move in a smoother manner.

The screw device according to the present embodiment provides further advantages as follows. Since the loaded ball rolling groove 2*b* of the nut body 21 is extended to comprise the outer circumferential side 13*b* of the curvature radius change section 13, it is easier to produce the curvature radius change section 13.

Further, at least part of the inner circumferential side of the curvature radius change section 13 is formed on the outer circumferential surface of the screw shaft 1. The balls 4 can therefore be rotated in response to rotating the screw shaft 1.

The remaining part 13*c*1 of the inner circumferential side of each of the curvature radius change sections 13 is formed at each of the circulation components 22. Hence, even when the curvature radius of the curvature radius change section 13 is made larger, it can be prevented that the balls 4 have an excessively larger allowance therearound.

The cross sections of both the loaded ball rolling groove 2*b* of the nut body 21 and the outer circumferential side 13*b* of each of the curvature radius change sections 13 are shaped into a gothic arch groove form, which is able to contact at two points of each of the balls 4. The contact points of the balls 4 can be agreed with each other before and after the boundary 43 between the loaded ball rolling path 3 and the return path 5.

The gist of the present invention will not be restricted to the foregoing embodiment, and, without departing the spirit of the present invention, it is also possible to embody the present invention into other various modes.

In the foregoing embodiment, the track centerline of the curvature radius change section is the transition curve having a lead. That is, at the connection point between the curvature radius change section and the loaded ball rolling path, the tangential direction of the track centerline in the curvature radius change section completely agrees with the tangential direction of the track centerline in the loaded ball rolling path. However, as long as the loaded ball rolling path and the curvature radius change section can be connected smoothly to each other, it is possible that the track centerline in the curvature radius change section is set by a transition curve with no lead. In this case, the track centerline in the curvature radius change section is positioned in a plane perpendicular to the axial line of the nut. Nevertheless, it is still preferable to have a lead to make the present invention provide the maximum advantage.

The foregoing embodiment has been described regarding a structure in which the outer circumferential side of the curvature radius change section is produced by extending the loaded ball rolling groove of the nut body. As an alternative example, it is possible to produce the outer circumferential side of the curvature radius change section at each of the circulation components.

Furthermore, the foregoing embodiment has exemplified the nut circulation structure called "an end deflector type" (in which the through hole is formed through the nut body and the circulation component having the direction changing path 12 is mounted on both axial ends of the nut body). Alternatively, the nut may have a circulation configuration structured as "a return pipe type" (in which a return pipe provided with the return path is attached to the nut body).

The foregoing embodiment has also exemplified that the cross sections of both the loaded ball rolling groove of the nut body and the outer circumferential side of each of the curvature radius change sections are shaped into a gothic arch groove form made by combining two arcs. Alternatively, these cross sections can be shaped into a circular arc groove form made by a single arc.

Still alternatively, the rolling members may be realized by rollers, instead of using balls.

The present specification is based on Japanese Patent Application No. 2013-114802 filed on May 31, 2013, the description of which is all incorporated herein by reference.

REFERENCE SIGN LIST

1 . . . screw shaft
1a . . . ball rolling groove (rolling-member rolling groove)
2 . . . nut
2b . . . loaded ball rolling groove (loaded rolling-member rolling groove)
3 . . . loaded ball rolling path
3a . . . track center line of balls in loaded ball rolling path
4 . . . balls (rolling members)
5 . . . return path
13 . . . curvature radius change section
13a . . . track centerline of balls in curvature radius change section
13b . . . outer circumferential side of curvature radius change section
13c . . . inner circumferential side of curvature radius change section
13c1 . . . remaining part of inner circumferential side of curvature radius change section
13c2 . . . part of inner circumferential side of curvature radius change section
21 . . . nut body
22 . . . circulation component

The invention claimed is:

1. A screw device comprising:
a screw shaft having a helical rolling-member rolling groove on an outer circumferential surface thereof;
a nut having a helical loaded rolling-member rolling groove opposed to the rolling-member rolling groove on an inner circumferential surface thereof;
a return path connecting one end and the other end of a helical loaded rolling-member rolling path formed by the rolling-member rolling groove of the screw shaft and the loaded rolling-member rolling groove of the nut; and
a plurality of rolling members arranged in the loaded rolling-member rolling path and the return path, wherein
when viewed in the axial direction of the nut,
a curvature radius change section is provided in the return path
the curvature radius change section is configured so that a curvature radius of a track centerline of the rolling members in the return path is equal to or larger than a curvature radius of a track centerline of the rolling members in the loaded rolling-member rolling path, and so that the curvature radius of the track centerline of the rolling members in the return path increases continuously or in a stepped manner by combining two or more arcs with increasing distance from the loaded rolling-member rolling path, and
each of a sectional shape orthogonal to a longitudinal direction of the loaded rolling-member rolling groove of the nut and a sectional shape orthogonal to a longitudinal direction of an outer circumferential side of the curvature radius change section is formed into a gothic arch groove shape which comes into contact with balls at two points, the balls serving as the rolling members.

2. The screw device of claim 1,
wherein the nut comprises a nut body having the loaded rolling-member rolling groove and a circulation component which is attached to the nut body and having at least part of the return path, and
wherein the curvature radius change section includes the outer circumferential side formed on the nut body by extending the loaded rolling-member rolling groove of the nut body.

3. The screw device of claim 2, wherein
the curvature radius change section includes an inner circumferential side at least part of which is configured by the outer circumferential surface of the screw shaft.

4. The screw device of claim 3, wherein
the inner circumferential side of the curvature radius change section includes a remaining part which is other than the at least part, the remaining part being formed in the circulation component.

5. The screw device of claim 1, wherein
a track centerline of the rolling members moving along the outer circumferential side of the curvature radius change section is either a transition curve or a combined curve formed by combining a plurality of arcs of mutually different curvature radiuses.

6. The screw device of claim 2, wherein
a track centerline of the rolling members moving along the outer circumferential side of the curvature radius change section is either a transition curve or a combined curve formed by combining a plurality of arcs of mutually different curvature radiuses.

7. The screw device of claim 3, wherein
a track centerline of the rolling members moving along the outer circumferential side of the curvature radius change section is either a transition curve or a combined curve formed by combining a plurality of arcs of mutually different curvature radiuses.

8. The screw device of claim 4, wherein
a track centerline of the rolling members moving along the outer circumferential side of the curvature radius change section is either a transition curve or a combined curve formed by combining a plurality of arcs of mutually different curvature radiuses.

9. The screw device of claim 1, wherein
a length of the curvature radius change section in a longitudinal direction thereof is more than twice as large as a diameter of the balls serving as the rolling members.

10. The screw device of claim 2, wherein
a length of the curvature radius change section in a longitudinal direction thereof is more than twice as large as a diameter of the balls serving as the rolling members.

11. The screw device of claim 3, wherein
a length of the curvature radius change section in a longitudinal direction thereof is more than twice as large as a diameter of the balls serving as the rolling members.

12. The screw device of claim 4, wherein
a length of the curvature radius change section in a longitudinal direction thereof is more than twice as large as a diameter of the balls serving as the rolling members.

\* \* \* \* \*